Dec. 23, 1952　　　W. F. RATCLIFF　　　2,623,074
PRODUCTION OF ALCOHOLS AND GASOLINE BY THE OXO PROCESS
Filed Aug. 19, 1948
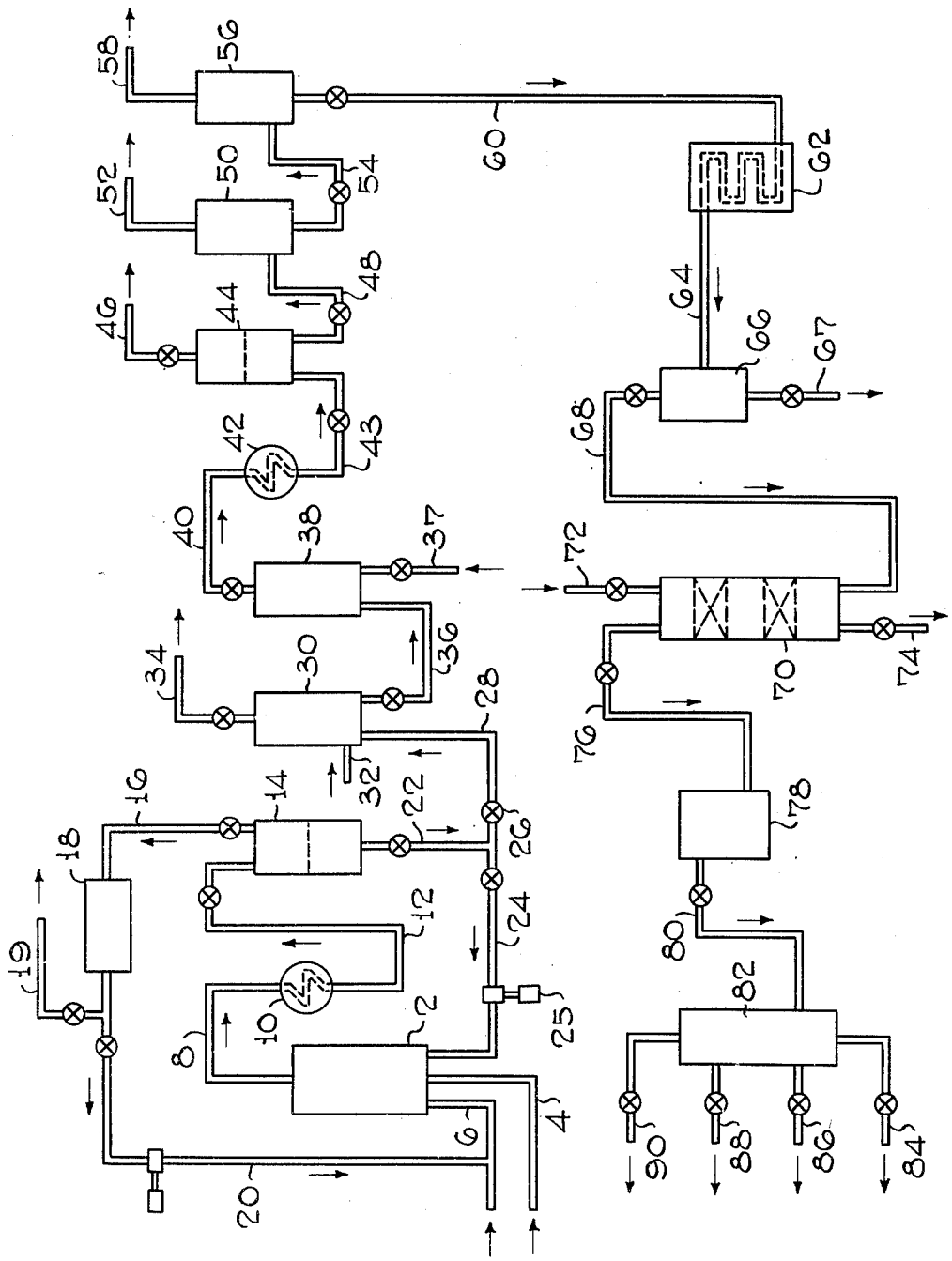
Walter F. Ratcliff　Inventor
By J. Cushman　Attorney Patented Dec. 23, 1952

2,623,074

UNITED STATES PATENT OFFICE 2,623,074

PRODUCTION OF ALCOHOLS AND GASOLINE BY THE OXO PROCESS

Walter F. Ratcliff, Baton Rouge, La., assignor to Standard Oil Development Company, a corporation of Delaware Application August 19, 1948, Serial No. 45,038

9 Claims. (Cl. 260—638)

The present invention relates to the preparation of high-octane motor fuels. More specifically the present invention relates to a method for advantageously utilizing the secondary reaction and by-products formed in the synthesis of aldehydes and alcohols from olefins and carbon monoxide and hydrogen.

It is now known in the art that oxygenated organic compounds may be synthesized from organic compounds containing olefinic linkages by a reaction with carbon monoxide and hydrogen in the presence of catalyst containing metals of the iron group, preferably cobalt, in a two-stage operation in which predominantly aldehydes and minor proportions of ketones, alcohols and secondary reaction products are formed in the first step in the presence of the carbonylation catalyst, and the products from the first stage may then be hydrogenated in a second stage to convert the organic carbonyl compounds, containing one more carbon atom than the olefinic starting material, to the corresponding alcohol in the presence of a catalytic reducing agent such as nickel, copper chromite, sulfactive catalysts such as oxides and sulfides of tungsten, nickel and molybdenum and the like.

The carbonylation reaction provides a particularly attractive method of preparing primary alcohols to supply the large market for plasticizers, detergents, solvents and the like, and amenable to the reaction are most carbon compounds possessing an olefinic linkage.

The catalyst for the first stage of the process is usually employed in the form of an oil soluble compound of the catalytically active carbonylation metal. Thus, as suitable catalysts, are such organic salts as cobalt or iron stearate, oleate or naphthenate. Catalyst concentrations may vary from about 0.5 to 5.0% by weight of the catalyst salt based on the olefinic feed. The first stage of the carbonylation reaction is generally carried out at temperatures in the range of from about 250° to 450° F. depending upon the nature of the olefin and other reaction conditions. In general, the lower olefins react at lower temperatures than the higher molecular weight olefins. Pressures are generally maintained in the range of 1500 to 4500 p. s. i. g.

One of the problems that has been encountered in the carbonylation reaction has been the formation of secondary reaction products and their utilization. These byproducts arise out of numerous secondary reactions that take place in the course of the main series of reactions which form alcohols containing one more carbon atom than the olefinic material from which they are prepared. Thus the carbonylation reaction proper is a highly exothermic reaction, with a heat release of the same high order of magnitude as in the hydrocarbon synthesis reaction, about 35 to 50 K cal./gram-mol olefinic double bond reacted. For this reason, very careful temperature control is required in the carbonylation reaction zone to prevent decomposition of the carbonylation catalyst in its active form, the metal carbonyl, such as cobalt carbonyl, to metallic cobalt. Above 3000 p. s. i. g. (1500 p. s. i. g. CO partial pressure) cobalt carbonyl starts to decompose at an appreciable rate above 350° F. The presence of cobalt metal catalyzes such secondary reactions as hydrogenation of the olefin feed, formation of hydrocarbon synthesis products from the $H_2$ and CO feed, polymerization of the aldehydes formed, by such reactions as aldol condensations, and the like. Other secondary reactions not necessarily catalyzed by metallic cobalt are formation of ketonic material produced by the interaction of two mols olefin per mol of carbon monoxide.

From the aldehyde synthesis stage the aldehydic product, containing in solution dissolved catalyst, and admixed with unreacted olefins and secondary reaction products formed in the carbonylation stage is generally withdrawn to a catalyst removal zone, or decobalter, where the material is heat-treated to decompose the active form of the catalyst, such as cobalt carbonyl, to the metal. Temperatures in the range of 150–400° F. are required, and the presence of the finely divided metal resulting from the decomposition of the carbonylation catalyst favors such reactions as aldol condensations to form higher molecular weight oxygenated material and also reactions of the type known as the Cannizzaro reaction, wherein two mols of aldehyde react to form a mol of acid and a mol of alcohol.

The reaction products and unreacted material free of carbonylation catalyst are generally transferred to a hydrogenation vessel, where the aldehydes are hydrogenated to alcohols over either sulfur-sensitive or sulfactive hydrogenation catalysts at temperatures of about 150°–500° F. and pressures in the range of 1500–4500 p. s. i. g. As a result of the hydrogenation reaction, alcohols are formed, and these react to a certain extent with unchanged aldehydes to form acetals and hemiacetals, and ethers. Thus, when a $C_7$ olefinic fraction is reacted with CO and $H_2$ under carbonylation conditions and the reaction product hydrogenated, the crude reaction product from the hydrogenation stage comprises the following:

| Material | Formation |
|---|---|
| $C_7$ Olefin and Paraffins | Unreacted and hydrogenated feed. |
| $C_8$ Olefins | Dehydration of alcohols. |
| $C_8$ Paraffins | Excessive hydrogenation of alcohols. |
| $C_8$ Alcohols | Principal product. |
| $C_8$ Aldehydes | Incomplete hydrogenation. |
| $C_{24}$ Acetals | Reaction between aldehydes and alcohols. |
| $C_{15}$ Ketones | Reaction between 2 moles olefin and CO. |
| $C_{16}$ Hemiacetals | Reaction between aldehydes and alcohols. |
| $C_{16}$ Ethers | Reduction of acetals. |
| Acids | Cannizzaro reaction; side reactions, Naphthenic acids from catalyst. |
| Esters | Reaction of above acids with alcohol. |
| Aldols, ketols | Higher molecular weight condensation products of aldehydes and ketones. |

The final stages of the process involve the separation of the desired hydrogenated material from the non-alcoholic residue, and it is to these products that the present invention applies. As it is performed generally, the crude hydrogenation product, comprising the products enumerated in the illustration example above, is first subjected to a distillation process to distill overhead hydrocarbons boiling below the desired alcohol range, and the bottoms from this distillation, comprising the alcohol fraction, is subjected to a second distillation stage, where alcohols are taken overhead. The bottoms from this alcohol distillation, consisting as they do of polymeric material such as polymerized alcohols and ketones, high molecular weight ethers, esters, acetals, acids, etc., have been considered to be of only secondary value as fuel. These bottoms, comprising usually 20–30% of the total hydrogenation product had the effect of cutting down substantially the yield and alcohol selectivity, and thus the economic attractiveness of the process.

The surprising discovery has now been made that the bottoms from this carbonylation process, after the alcohols have been removed by distillation, may be employed as feed stock to a catalytic reforming process to produce an exceptionally high-octane motor fuel consisting almost entirely of olefinic material and containing less than 0.1% oxygen. The treating conditions were of the same order of severity as those generally employed in treating hydrocarbon synthesis oil product with bauxite or other reforming catalyst. In the case of the hydrocarbon synthesis oil layer, however, it was found that oxygenated compounds in the oil layer had a deleterious effect upon the antiknock characteristics of the gasoline obtained by treating the layer with bauxite or other reforming catalyst. However, removing the oxygenated compounds from the oil layer by solvent extraction and then catalytically reforming the raffinate was found to give decided improvement in octane rating over reforming the oil layer without first extracting the oxygenated compounds. In the present case, however, the unexpected discovery was made that the bottoms from the carbonylation reaction, which contain in the range of from 5 to 8% oxygen, completely contrary to prediction, undergo a catalytic reformation under similar conditions to reformation of hydrocarbon synthesis products, to give a product of substantially higher octane rating than hydrocarbon synthesis oil layer from which the oxygenated materials have been extracted prior to catalytic reformation.

The present process thus differs fundamentally from the process wherein hydrocarbon synthesis oil layer products are catalytically reformed with bauxite. In the latter case, the improvement in the anti-detonating characteristics of the gasoline obtained by treatment with the reformation catalyst arises largely from isomerization reactions wherein straight chain apha olefins are isomerized to other straight chain olefins with a shift of the double bond toward the middle of the molecule, or to a rearrangement of a straight chain olefin to form an iso olefin. In these cases, the presence of oxygenated material in the feed to be reformed degrades the quality of the final product. When however as in the present case, the feed contains high concentrations of oxygenated material and relatively low concentrations of olefinic material, an entirely different and unexpected effect is obtained. Instead of a poorer product than would be obtained by treating an oxygen-free hydrocarbon material, a superior product is obtained.

It is therefore, the principal object of the present invention to produce high-octane motor fuels from the by-products of the carbonylation reaction.

Another object of the invention is to increase the economic attractivenss of the aldehyde synthesis process by utilization of reaction products hitherto only of secondary value as fuel.

The present invention will best be understood from the more detailed description hereinafter, wherein reference will be made to the accompanying drawing, which is a schematic illustration of a system suitable for carrying out a preferred embodiment of the invention.

Referring now to the drawing, an olefinic hydrocarbon is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprises but a single packed zone, or even, if desired, may contain no packing.

The olefinic feed preferably contains dissolved therein 1–3% by weight of cobalt naphthenate based on the olefin. Other compounds of cobalt or of iron, or their mixtures, may also be used. Simultaneously a gas mixture comprising $H_2$ and CO in the approximate ratio of 0.5 to 2 volumes of $H_2$ per volume of CO is supplied through line 6 to primary reactor 2 and flows concurrently through reactor 2 with said olefin feed. Reactor 2 is preferably operated at a pressure of about 2500–3500 p. s. i. g. and at a temperature of about 250°–450° F., depending upon the olefin feed and other reaction conditions. The rate of flow of synthesis gases and olefin through reactor 2 is so regulated that the desired conversion level of the olefin is obtained.

Liquid oxygenated reaction products containing catalyst in solution and unreacted synthesis gases are withdrawn overhead from an upper portion of high pressure reactor 2 and are transferred through line 8 to cooler 10 in which any conventional means of cooling are employed, and from there via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 or purged.

A stream of primary reaction product containing dissolved therein relatively high concentration of cobalt carbonyl is withdrawn from separator 14 through line 22. A portion of said withdrawn stream may be recycled, if desired, to reactor 2 via line 24 and recycle pump 25 to aid in the cooling and maintenance of temperature control of the primary carbonylation stage. The balance of the primary reaction product may be withdrawn through pressure release valve 26 and through line 28. The withdrawn liquid may comprise unreacted olefin and secondary reaction product as well as aldehydes and dissolved catalyst compounds, and it is passed to a catalyst removal zone 30, which is operated at a temperature of about 200° to 400° F., and at pressures from about 50 to 300 p. s. i. g. Stripping gas, such as hydrogen, may be admitted through line 32. Under the conditions in zone 30 the dissolved catalyst, which enters predominantly in the form of metal carbonyl, is decomposed to the metal and carbon monoxide. The metal precipitates, while the CO may be purged with $H_2$ and withdrawn through line 34.

Liquid oxygenated products now substantially free of carbonylation catalysts are withdrawn from zone 30 through line 36 and passed to hydrogenator 38. Simultaneously hydrogen is supplied to reactor 38 through line 37 in proportions sufficient to convert the organic carbonyl compounds in the oxygenated feed into the corresponding alcohols. Hydrogenator 38 may contain a mass of any conventional hydrogenation catalyst, such as nickel, copper chromite, tungsten or molybdenum sulfide, etc. Depending upon the catalyst reactor 38 may be operated at pressures ranging from 2500 to 4500 p. s. i. g. and at temperatures of from about 300° to 500° F. and an $H_2$ rate of about 5000 to 20,000 cu. ft./bbl. feed.

The products of the hydrogenation reaction and unreacted hydrogen may be withdrawn overhead through line 40 from reactor 38, then through cooler 42 into separator 44, where hydrogen may be withdrawn overhead through line 46 for disposal or use as desired. The liquid products are withdrawn from separator 44 through line 48 to hydrocarbon still 50 wherein are distilled overhead low boiling products, mostly hydrocarbons boiling below the alcohol product desired. Thus when a $C_7$ olefin fraction is the feed to the process, generally the product boiling up to 340° F. is removed as a heads cut in hydrocarbon still 50 and this material is withdrawn overhead through line 52 and may be used as a gasoline blending agent. The bottoms from this primary distillation are withdrawn from hydrocarbon still 50 through line 54, and sent to alcohol still 56, where the product alcohol boiling in the desired range may be removed overhead through line 58 by distillation at atmospheric or lower pressures, depending on the molecular weight of the alcohols.

The bottoms from alcohol still 56 are withdrawn through line 60 and may be sent to coil heater 62 and passed through line 64 and flash drum 66, then via line 68 to treating tower 70 at a temperature of about 800°–1000° F. and a pressure of about 5 to 30 p. s. i. Treating chamber 70 may contain a plurality of superimposed individual layers of catalytic reforming material. Such reforming catalysts may be bauxite or synthetic alumina-silica gel cracking catalyst consisting of about 86–88% by weight silica and 12–14% alumina. The latter catalyst is preferably employed after partial deactivation and plant contamination. The oil comprising oxygenated bottoms is flashed from flash drum 66 into tower 70 which it enters through line 68 and passes upwardly through the catalyst layers. The vapor feed rate and the amount of catalyst in 70 are so chosen that a throughput of about 0.5 to about 5.0 v./v./hr. may be maintained. Treating chamber 70 is also provided with regenerating gas inlet 72 and outlet 74 through which air, or air diluted with an inert gas may be admitted to regenerate the catalyst by burning off the carbon at any desired interval, preferably after purging with steam. The regeneration treatment may be carried out at temperatures of about 900° to 1200° F.

The cracked and reformed vapors may be withdrawn upwardly from treater 70 through line 76 and condensed in condenser 78 and thence via line 80 to fractionating column 82 from which bottoms may be withdrawn through line 84, gas oil through line 86, gasoline range hydrocarbons through line 88 and gas through line 90.

Gasoline withdrawn through line 88 is ready for use, if desired, directly or after blending with other fuels or adding of antiknock agents, although because of the high antidetonating characteristics of the gasoline made from the present feed stock, this is not necessary. The bottoms and the gas oil may be treated in any conventional manner, such as thermal or catalytic cracking to produce further amounts of gasoline, or these fractions may be used as fuels, diesel oils, etc.

It will be appreciated that the system illustrated by the drawing permits of many modifications obvious to those skilled in the art without deviating from the spirit of the invention. For instance, chamber 70 may be a conventional fluid type reactor permitting continuous operation of the catalytic reforming or cracking and catalyst regeneration, in a manner known per se.

The following data obtained from a pilot plant run indicate the utility of the process described above. In the run summarized below the catalyst employed is a spent silica alumina catalyst withdrawn from a commercial gas oil fluid catalytic cracking plant. The feed charged through the treating vessel comprised the bottoms from the alcohol distillation of a product obtained by reacting a $C_7$ olefin cut in accordance with the carbonylation process detailed above. The cut, boiling between 180°–210° F. was part of a nonselective polymer product of propylenes and butylenes prepared in a polymer (phosphoric acid on silica) plant. The alcohol bottoms, comprising about 25% of the hydrogenation product, boiled in the range of 382° to 658° F. with an oxygen content of about 6.4%. The tests were made in a fixed-bed unit. For comparison, also tabulated are the results obtained when hydrocarbon synthesis oil layer, both prior to and after extraction of oxygenated compounds, is treated under the same conditions.

|  | Hydrocarbon Synthesis Oil Layers | Carbonylation Reaction Alcohol Bottoms |
|---|---|---|
| Percent oxygen in feed | 5.7 | None | 6.4 |
| Treating temperature, °F | 900 | 900 | 900 |
| Feed Rate, v./v./hr | 3 | 3 | 3 |
| Regeneration cycle hrs | 1 | 1 | 1 |
| Pressure | Atm. | Atm. | Atm. |
| Catalyst | | Spent silica-alumina cracking catalyst | |
| Yields (Output Basis): | | | |
| Total C₄, vol. percent | 5.4 | 5.6 | 16.4 |
| C₅–30° F., vol. percent | 70.2 | 81.1 | 59.1 |
| Gas oil+bottoms, vol. percent | 14.4 | 9.9 | 12.3 |
| Carbon, wt. percent | 1.9 | 1.2 | 1.6 |
| Research octane number (clear) (as 10 lb. RVP gasoline) | 87.9 | 90.9 | 95.6 |

*Inspection of gasoline prepared from alcohol bottoms*

|  | C₅–430° F. V. T. | 10 lb. Reid Vapor Pressure (Includes C₅ from gas) |
|---|---|---|
| Gravity, °API | 58.4 | 64.2 |
| Aniline Point, °F | 72 | |
| Bromine Number, cg./g | 145 | |
| Wt. per cent Oxygen | 0.1 | |
| Research Octane No. Clear | 94.8 | 95.6 |
| ASTM Gum | 4.0 | |
| Per cent D+L at 158° F | 4.5 | 21.0 |
| Per cent D+L at 212° F | 33.5 | 45.5 |
| Per cent D+L at 257° F | 66.0 | 72.0 |
| Reid Vapor Pressure, lbs./sq. in | 3.7 | 10.0 |

The above data indicates that by catalytic treating the highly oxygenated bottoms from the carbonylation reaction with spent catalytic cracking catalyst, a gasoline of exceptionally good anti-detonating characteristics is produced, consisting almost entirely of olefins and containing only a very small amount of oxygen. Thus essentially complete removal of oxygen occurred at treating conditions which are equal in severity to those used for treating hydrocarbon synthesis products, but are mild in comparison to those used to crack petroleum gas oils. Furthermore, these data also show that whereas the hydrocarbon synthesis oil layers which contain oxygenated compounds give a poorer product on catalytic reformation than those obtained when the oxygenated material is first removed, the alcohol bottoms which contain a higher percentage of oxygen than the unextracted hydrocarbon synthesis oil layer give a product having a substantially superior anti-detonating characteristic than the extracted hydrocarbon synthesis oil layer. The five point octane number difference is of great significance in this high octane range.

Thus by the process of the present invention, a product whose only utility had hitherto been as a fuel has now unexpectedly been shown to be a valuable feed stock for catalytically preparing high octane gasoline.

While the foregoing description and exemplary operation have served to illustrate specific applications and results of this invention, other modifications obvious to those skilled in the art are within the scope of the invention.

What is claimed is:

1. The process of producing gasoline of high anti-detonating characteristics which comprises contacting CO and H₂ with olefinic carbon compounds in the presence of a carbonylation catalyst under conditions of elevated temperature and pressure adapted to produce a major proportion of oxygenated reaction products containing one more carbon atom than said olefin and a minor proportion of oxygenated reaction products of substantially higher molecular weight than said major portion in said zone, contacting said reaction products with a hydrogenation catalyst under hydrogenation conditions, withdrawing hydrogenated and non-hydrogenated liquid product from said hydrogenation zone, passing said liquid products to a distillation zone, recovering alcohols containing one more carbon atom than said olefinic carbon compounds from said distillation zone, recovering a liquid product boiling higher than said alcohols and comprising high-boiling oxygen-containing bottoms from said distillation zone, contacting said distillation bottoms with a aluminum-comprising highly adsorbent contacting agent in a treating zone at treating conditions of temperature, pressure, and contact time conducive to a substantial dehydration, reforming and cracking of said bottoms, said conditions comprising temperatures of from 800° to 1000° F., pressures of from about 5 to about 30 p. s. i. and contact times of about .5 to about 5 v./v./hr. to produce a cracked hydrocarbon product, and recovering a high-octane gasoline cut from said product.

2. The process of claim 1 in which said carbonylation catalyst is a cobalt compound.

3. The process of claim 1 in which said contacting agent is bauxite.

4. The process of claim 1 in which said selective contacting agent comprises a synthetic silica alumina composition.

5. The process of claim 4 in which said agent contains about 12–14% by weight of alumina and 86–88% silica.

6. The process of claim 5 in which said agent is a partially spent cracking catalyst.

7. The process of producing gasoline of high anti-detonating characteristics which comprises contacting CO and H₂ with a hydrocarbon comprising essentially heptenes in the presence of a cobalt catalyst under conditions of temperature and pressure adopted to produce reaction products comprising oxygenated organic compounds containing more than seven carbon atoms in the molecule in a carbonylation zone, withdrawing said reaction products from said carbonylation zone, removing cobalt catalyst from said reaction products, contacting said reaction products with a hydrogenation catalyst in a hydrogenation zone under conditions to convert substantial quantities of said products to octyl alcohols, withdrawing liquid products from said zone, passing said products to a distillation zone, recovering octyl alcohols from said zone, recovering high-boiling oxygen-containing bottoms from said zone, contacting said bottoms with an aluminum-comprising adsorbent contacting agent in a treating zone at a temperature of about 800–1000° F. and at about atmospheric pressure and at a feed rate of about 1–5 v./v./hour, allowing said bottoms to remain resident in said treating zone for a period of time sufficient to produce a hydrocarbon product consisting essentially of olefins and containing 0.1% or less of oxygen, and recovering a high-octane gasoline cut from said product.

8. The process of claim 7 wherein said contacting agent is bauxite.

9. The process of claim 7 wherein said contacting agent is a partially spent alumina-silica cracking catalyst.

WALTER F. RATCLIFF.

(References on following page)

REFERENCES CITED

The following references are of record in the file of this patent:

UNITED STATES PATENTS

| Number | Name | Date |
|---|---|---|
| 2,264,427 | Asbury | Dec. 2, 1941 |
| 2,403,524 | Hagemann | July 9, 1946 |
| 2,452,121 | Grahame | Oct. 26, 1948 |
| 2,464,916 | Adams et al. | Mar. 22, 1949 |
| 2,470,216 | Keith | May 17, 1949 |

FOREIGN PATENTS

| Number | Country | Date |
|---|---|---|
| 879,903 | France | Dec. 10, 1942 |
| 735,276 | Germany | May 11, 1943 |